Jan. 10, 1950      M. C. BISKEBORN      2,493,800

LOCATION OF FAULTS IN ELECTRICAL TRANSMISSION SYSTEMS

Filed April 15, 1947      3 Sheets-Sheet 1

INVENTOR
M.C. BISKEBORN
BY
ATTORNEY

Jan. 10, 1950    M. C. BISKEBORN    2,493,800
LOCATION OF FAULTS IN ELECTRICAL TRANSMISSION SYSTEMS
Filed April 15, 1947    3 Sheets-Sheet 2
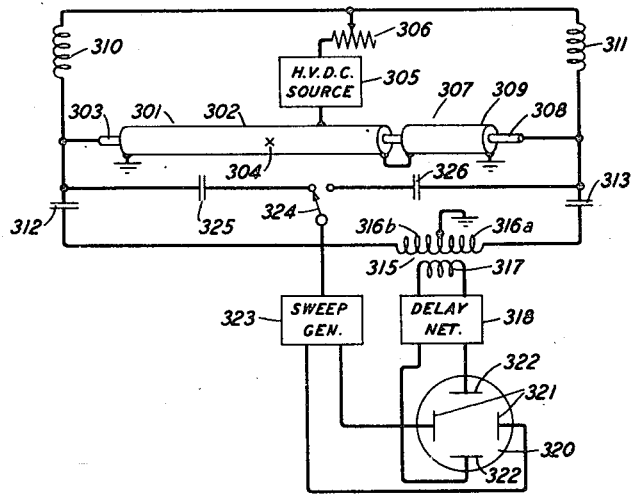
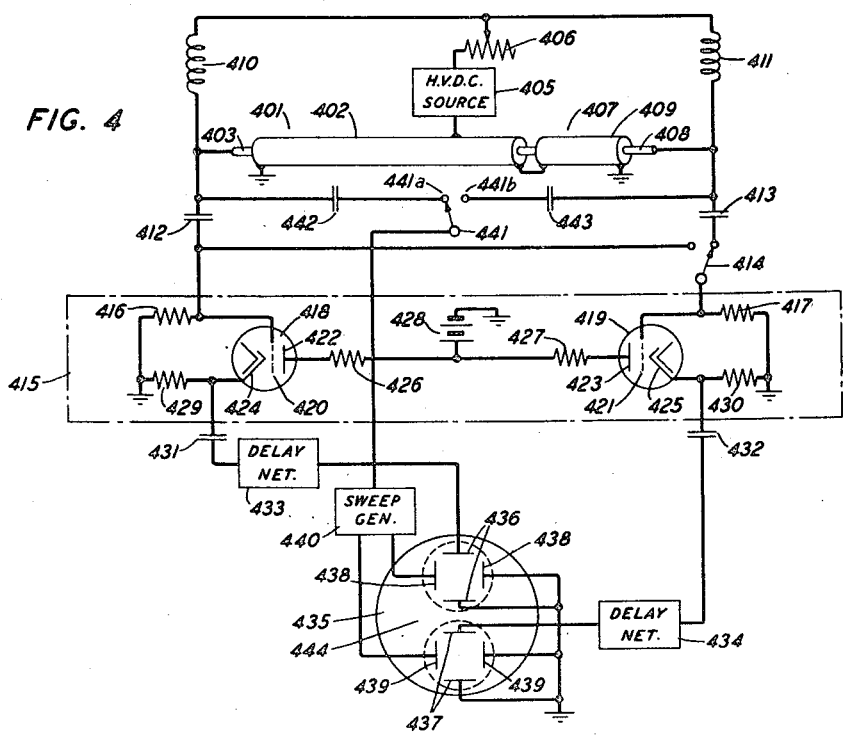
INVENTOR
M.C. BISKEBORN
BY
N. S. Ewing
ATTORNEY Jan. 10, 1950   M. C. BISKEBORN   2,493,800
LOCATION OF FAULTS IN ELECTRICAL TRANSMISSION SYSTEMS
Filed April 15, 1947   3 Sheets-Sheet 3

POINT OF REST

INVENTOR
M.C. BISKEBORN
BY
ATTORNE

Patented Jan. 10, 1950

2,493,800

UNITED STATES PATENT OFFICE 2,493,800

LOCATION OF FAULTS IN ELECTRICAL TRANSMISSION SYSTEMS

Merle C. Biskeborn, Baltimore, Md., assignor to Bell Telephone Laboratories, Incorporated, New York, N. Y., a corporation of New York Application April 15, 1947, Serial No. 741,609

12 Claims. (Cl. 175—183)

This invention relates in general to the location of faults in electrical transmission systems; and more particularly, it relates to the location of high voltage faults in transmission lines.

Fault-locating techniques useful in connection with coaxial cables and other types of transmission lines for the location of defects resulting in direct short-circuits may be quite unsatisfactory for the location of defects that result in breakdowns only at high voltage, such as, for example, metallic inclusions in disc-insulated coaxial cables.

An object of this invention is to provide improved techniques and apparatus particularly adapted for the location of high voltage faults in coaxial and other shielded cable systems.

In accordance with one embodiment of the present invention, a sufficiently high voltage is impressed between the outer and center conductors of a test coaxial cable (i. e., the coaxial cable to be tested) to cause arcing to occur periodically at any defective point therealong which is susceptible to high voltage breakdown. The periodic transient waves generated at the arc travel in opposite directions along the test cable, one end of which is connected directly to a balanced indicating circuit, and the other end of which is connected to the same indicating circuit through an auxiliary cable of variable length. The relative times of arrival of the transient waves at the two ends of the cable system are compared on the screen of a cathode-ray oscilloscope which has a sweep frequency synchronized with the frequency of the fault-generated waves. Calibrated lengths of auxiliary cable are added to one end of the system until simultaneous arrival of the signals from the two ends is indicated. The distance to the fault is then determined in terms of the added lengths of cable.

In accordance with a particular feature of the invention, a circuit of variable impedance is connected between the high voltage source and the cable to enable regulation of the arc discharge to the desired periodicity.

One manner of indicating coincidence of arrival of the transient signals from the two ends of the cable system is by producing cancellation on the oscilloscope screen. In accordance with one embodiment of the invention, this is done by phase-inverting the signals from one end of the system with respect to corresponding signals from the other end in a conventional vacuum tube phase-inverting circuit, the output from which is impressed on the oscilloscope indicating circuit.

In accordance with a second embodiment of the invention, cancellation of simultaneously arriving signals is produced by impressing detected waves from opposite ends of the cable system onto opposite vertical deflecting plates of an oscilloscope indicator.

In a third embodiment of the invention, cancellation of simultaneously arriving signals is produced by impressing the outputs from respective ends of the cable system onto opposite ends of the centrally grounded primary winding of a transformer coil whose secondary winding is connected between opposite deflecting plates of an oscilloscope.

Another manner of indicating coincidence of arrival of signals at different ends of the cable system is by actual or apparent superposition of representative images on the oscilloscope screen. In accordance with a fourth embodiment of the invention, a double beam cathode ray oscilloscope is so connected to the detecting circuit that the respective signals from different ends of the cable system are indicated on coextensive traces appearing one above the other on the screen.

In accordance with a fifth embodiment of the invention, coincidence of arrival of the received signals is indicated by apparent superposition of the images on the oscilloscope screen. This is brought about by the use of an oscilloscope indicator having a triangular sweep voltage, which is so connected that the beam is under control of signals arriving from one end of the cable system during its sweep in one direction, and under control of corresponding signals from the other end of the system during the return sweep, the two traces appearing superposed on the screen.

One of the advantages of the present system is that because of the high figure of merit inherent in coaxial cables of the types normally used in communication systems, particularly sharp transients are produced by an arcing fault which are amenable to precision measurements.

Other objects, features and advantages of the invention will be apparent upon study of the detailed description hereinafter and the attached drawings, of which:

Fig. 3 shows an embodiment of the present invention in which the signals from the two cable ends are fed into an oscilloscope circuit through opposite sections of a transformer primary;

Fig. 4 shows an embodiment of the present invention in which the indicator comprises a double-beam cathode ray tube;

Fig. 5b shows the output of the sweep voltage generator shown in Fig. 5a. Fig. 6 shows a preferred form of the auxiliary cable unit of variable length which is utilized in the embodiments of Figs. 1–5a.

Figure 1:
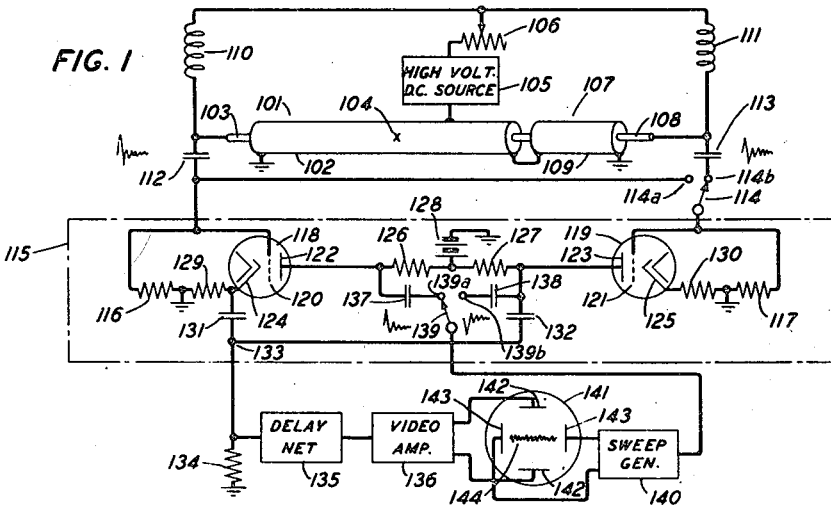
Fig. 1 shows an embodiment of the fault-locating system of the present invention in which responses travelling in opposite directions from the fault are passed through a vacuum tube phase inverter and superposed on the screen of a cathode ray indicator.

As pointed out hereinbefore, the present invention is particularly adapted for the location of high voltage defects in coaxial cable.

When breakdown occurs in a coaxial cable which has a direct current voltage applied between the center and outer conductors thereof, two identical waves are generated at the point of failure, one travelling toward one end, and the other travelling toward the opposite end of the cable. The exact character of the waves detected at either of the ends of the cable will depend on the character of the breakdown and the conditions at the ends. Assuming similar end conditions, the times of arrival of the waves at the respective ends are related to the location of the arcing fault. For example, if the fault is exactly in the middle of the length of test cable, the two waves will arrive at the ends simultaneously. As the fault is moved toward one end, the waves will arrive at the respective ends with a differential time interval which is proportional to twice the distance of the point of failure from the middle of the cable. In accordance with this invention, measurement of this differential time interval provides the means of locating the arcing fault.

Direct measurement of the aforesaid time interval with sufficient precision to make a fault location within several feet in a 1500 or 2000 foot length is very difficult. As an additional feature of the present invention, an auxiliary coaxial cable of variable length is provided which may be placed in series with the test cable, and the length adjusted so that the times of arrival of waves travelling in both directions from the fault are identical. Distance to the fault may then be computed in terms of the length of auxiliary cable added to the circuit and the length of the test cable.

In accordance with the present invention, one manner of indicating coincidence of arrival of the two waves is by superposing their respective responses in an indicating circuit in such a way that cancellation occurs. This expedient is employed in the system of Fig. 1, which will now be discussed in detail.

The test cable 101 may be a longitudinal seam coaxial cable of the type and size conventionally used for telephone communication, comprising a grounded cylindrical outer conductor 102 and an inner axial conductor 103 which are maintained at a uniform separation by means of thin disks of dielectric material such as hard rubber or polyethelyne disposed at regular intervals along the interior of the cable. The dielectric medium is thus almost wholly gaseous.

Assume the presence in the test cable 101 of a mechanical defect or metallic inclusion 104 which tends to increase the potential gradient between the outer conductor 102 and the inner conductor 103 at that particular point, making it more susceptible to high-voltage breakdown. Connected in series with the test cable 101, is an auxiliary cable 107 having an inner conductor 108 and a grounded outer conductor 109, and which is preferably of the form shown in detail in Fig. 6 of the drawings and described hereinafter with reference thereto.

A source of direct current potential 105 having a circuit which includes the variable rheostat 106 is connected through the radio frequency choke 110 between the inner conductor 103 and the grounded outer conductor 102, and through the radio frequency choke 111 between the inner conductor 108 and the grounded outer conductor 109 of the auxiliary cable 107. If a sufficiently high potential is impressed on the cable 101 by the source 105, a voltage breakdown occurs at the fault 104 which takes the form of a series of periodic arc discharges from the inner conductor 103 to the grounded outer conductor 102 initiating trains of waves which travel along the cable conductors in both directions from the fault 104. The wave-form of the transient waves generated is a function of the ratio of reactance to resistance in the cable circuit; and inasmuch as this ratio is usually high in cables of the type described, arc-generated transients therein take the form of steep-fronted waves. The power supplied by the source 105 should be sufficient to drive the R. C. circuit made up of the rheostat 106 and the capacitances of the primary and auxiliary cables 101 and 107 to cause discharge at the fault to occur at a rate suited to the image persistence of the indicating screen of the oscilloscope 141, which will be described hereinafter. The rheostat 106 functions to control the time constant of the source and the load.

Transient waves travelling from the fault 104 to the left-hand end of the cable 101, prevented from entering the circuit of the source 105 by the high frequency choke 110, are impressed upon a mixer and phase inverter circuit 115 through the condenser 112.

Transient waves travelling in the opposite direction from the fault 104 to the right-hand end of the cable 101 are passed through the auxiliary cable 107, which has an adjustable length. The auxiliary cable 107, a preferred form of which will be discussed hereinafter with reference to Fig. 6 of the drawings, is similar in structure to the cable 101, the left-hand end of the inner conductor 108 being connected to the right-hand end of the inner conductor 103, and the left-hand end of the outer conductor 109 being connected to the right-hand end of the outer conductor 102. Fault-generated transients arriving at the right-hand end of the conductor 108 are impressed upon the mixer and phase-inverter circuit 115 through the condenser 113.

The phase-inverter and mixer circuit 115, which is of a type well known in the art, includes the triodes 118 and 119, which respectively comprise plates 122 and 123, cathodes 124 and 125, and grids 120 and 121. The plates are positively energized by the source 128 connected thereto through separate circuits including the respective resistance feeds 126 and 127. The cathodes 124 and 125 are maintained at negative potentials with respect to the plates by connection to the respective cathode resistors 129 and 130; and the grids 120 and 121 are connected to ground and biased negatively with respect to the aforesaid cathodes through respective grid leaks 117 and 116.

Transient waves from the left-hand end of the cable 101 are fed onto the control grid 120 of tube 118, while waves from the right-hand end of the auxiliary cable 107 are fed onto the control grid 121 of tube 119. Output circuits from the tubes 118 and 119 are connected in reverse phase, the cathode 124 of the tube 118 and the plate 123 of the tube 118 being connected through respective condensers 131 and 132 to the output junction 133. Typical wave forms are shown at various points in the circuit.

The cathode ray tube indicating circuit, into which the composite output current from the mixer and phase-inverter circuit 115 is fed, includes the cathode ray indicating tube 141, sweep generator 140, delay network 135 and video amplifier 136.

The sweep generator 140, which may be what is known in the art as the one-trip triggered type, is connected through the switch 139 and contact 139a to the plate 122 of the triode 118, whereby the sweep frequency is synchronized with the frequency of the fault generated waves detected from the left-hand end of the cable 101. Thus synchronized, the saw-tooth sweep voltage from the output circuit of the generator 140 is impressed across the horizontal deflecting plates of the cathode ray oscilloscope 141. The sweep generator 140 may alternatively be connected through the switch 139 and the contact 139b to the plate 123 of the triode 119.

The composite output current from the junction 133, representing detected waves from both ends of the cable system which are superposed in reversed phase, is fed through the delay network 135 and the conventional video amplifier 136 onto the vertical deflecting plates 142 of the cathode ray tube 141. Vertical pips extending either in a positive or negative direction, corresponding to whichever end of the cable system is represented, appear on the screen 144, the horizontal displacement of the respective pips varying in accordance with the time of arrival of the waves from respective ends of the cable system.

The calibrate-measure switch 114 has been introduced in the circuit of the grid 121 of tube 119, so that for the purposes of checking the gain and phase delay in the two halves of the circuit, connection can be alternatively made through contact 114a to the left-hand end of the cable circuit 101. For ordinary operation, the switch 114 is retained in engagement with contact 114b which is connected to the right-hand end of the auxiliary cable 107.

In order to make a particular fault location, the length of the auxiliary cable 107 is adjusted until the positive and negative pips coincide, producing a cancellation or null response on the screen 144.

Assume L to be the known length of the test cable 101, and $l$ to be the length of auxiliary cable 107 added to the circuit, the distance X from the left-hand end of the cable 101 to the fault 104 may be computed from the following simple relationship:

$$X = \frac{L+l}{2}$$

Figure 2:
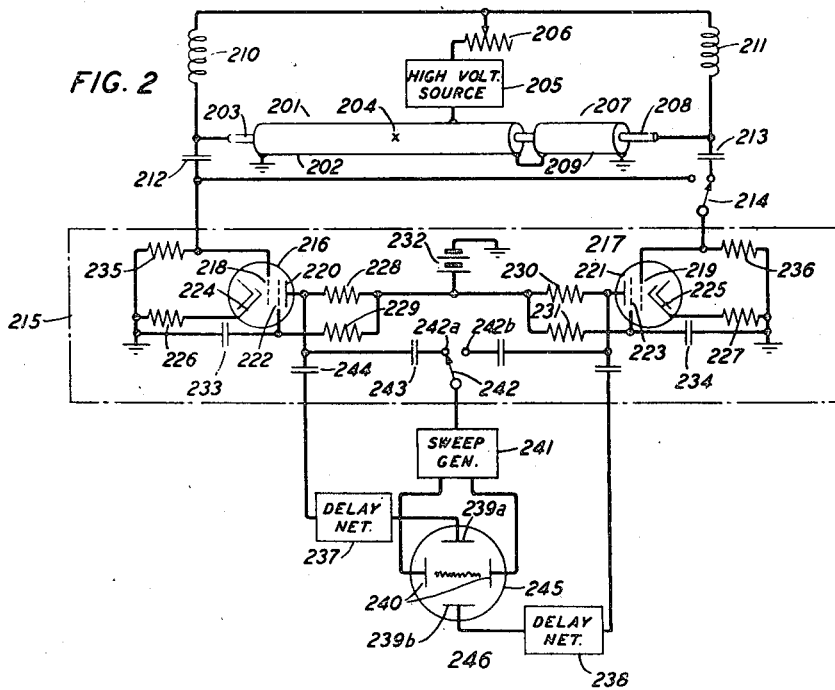
Fig. 2 shows an embodiment of the fault-locating system of present invention in which the respective signals from opposite ends of the cable system are fed onto opposite deflecting plates of the cathode ray indicator.

In the system of the present invention as shown in Fig. 2 of the drawings, cancellation of the indication on the screen of the cathode-ray oscilloscope in response to simultaneously arriving signals is brought about by impressing the respective signals from the opposite ends of the cable system on opposite vertical deflecting plates.

The primary and auxiliary cables, the high voltage source, the calibrate measure switch, and associated elements numbered 201—214 may be assumed to be similar in structure and functional relationship to the correspondingly numbered elements 101—114 described hereinbefore with reference to Fig. 1.

The detecting and indicating circuit 215, which replaces the phase inverter circuit 115 of Fig. 1, comprises the following elements. The tetrodes 216 and 217, which respectively comprise control grids 218 and 219, plates 220 and 221, screen grids 222 and 223, and cathodes 224 and 225. The respective cathodes 224 and 225, which are heated for electron emission by conventional means not shown, are maintained at the desired potentials with respect to ground by connection through the cathode resistors 226 and 227. The respective plates 220 and 221 are energized to the proper positive direct current potentials with respect to cathodes 224 and 225 by means of the battery 232, which also serves to maintain the respective screen grids 222 and 223 at positive direct current potentials slightly lower than the respective plate potentials by connection through the resistors 229 and 230. A path to ground for alternating current signals passing onto the respective screen grids 222 and 223 is provided by condensers 233 and 234. The signals flowing from the left-hand end of the cable 201 are impressed on the tetrode 216 through the control grid 218, which is maintained at the desired negative potential with respect to the cathode 224 by means of the grid leak resistor 235; in a similar manner, signals flowing from the right-hand end of the auxiliary cable 207 are impressed on control grid 219, which is maintained at the desired negative potential with respect to the cathode 225 by means of the grid-leak 236.

Alternating output current from the plate 220, which is proportioned to the transient responses from the left-hand end of the cable 201, is impressed on the upper vertical deflecting plate 239a of the cathode ray oscilloscope 245 through a circuit which includes the blocking condenser 234 and the delay network 237. A similar circuit including the blocking condenser 235 and the delay network 238 conducts the output current from the plate 221 proportioned to the transient responses from the right-hand end of the auxiliary cable 207 to the lower vertical deflecting plate 239b of the cathode ray oscilloscope 245.

The conventional cathode ray oscilloscope 245 comprises an electron gun and focusing electrodes not shown, a fluorescent screen 246, vertical deflecting plates 239a and 239b which control the vertical motion of the beam and which are connected, as hereinbefore described, so that their potentials are respectively controlled by signals from the left-hand end and the right-hand end of the cable system, and horizontal deflecting plates 240 which control the horizontal sweep of the beam. The delay networks 237 and 238 are designed to provide a sufficient time lapse between onset of the horizontal sweep cycle and vertical deflection of the beam by received signals.

Horizontal deflecting plates 240 are connected to the output of the sweep generator 241, which is what is known in the art as the one trip triggered type. The frequency of the saw-tooth voltage waves generated by the sweep generator 241 is controlled by the frequency of the transient vibrations received from either one end or the other of the cable system. Thus, the input of the sweep generator 241 is either connected to the plate circuit 220 through contact 242a of switch 242 and blocking condenser 243, or to the plate circuit 221 through the contact 242b and blocking condenser 244.

Vertical pips caused by fault-generated signals detected from the left-hand and right-hand ends of the cable system appear inverted on the screen with respect to one another, and are so positioned that coincidence of arrival of the signals from the two ends causes the two signals to be superposed and therefore to cancel. The distance to the fault may then be computed in terms of the added lengths of the auxiliary cables, as hereinbefore described with reference to the system of Fig. 1.

In accordance with the embodiment of the system of the invention which is shown in Fig. 3 of the drawings, cancellation on the screen in response to simultaneously arriving fault-generated signals is brought about by the substitution of a centrally grounded transformer circuit for the phase-inverter circuit of Fig. 1, and the tetrode detecting circuit of Fig. 2.

The primary and auxiliary cables, the high voltage source, and associated elements numbered 301—312 may be assumed to be similar in structure and functional relationship to correspondingly numbered elements in the systems of Figs. 1 and 2 described hereinbefore.

The transformer 315 comprises a primary coil 316 separated by a central connection to ground into substantially identical sections 316a and 316b, which are respectively connected to the fault-generated output from the left-hand end of the primary cable 01, and to the fault-generated output from the right-hand end of the auxiliary cable 307. Signals 180 degrees out of phase from the two halves 316a and 316b of the primary winding are induced in the secondary winding 317 of the transformer 315, which is connected across the vertical plates 322 of the cathode ray oscilloscope 319 in parallel with the delay network 317. The oscilloscope 317 is a conventional type such as oscilloscopes 141 and 245 described with reference to Figs. 1 and 2. As described with reference to previous embodiments, the horizontal sweep of the cathode ray beam is under control of a one-trip triggered sweep generator 323, the operation of which is periodically initiated by fault generated transients from either the left-hand end of the cable circuit by a connection thereto through contact 324a of switch 324 and blocking condenser 325 or by transients from the right-hand end of the cable circuit by connection through contact 324b and blocking condenser 326.

When the arrival of the fault-generated waves from the two ends of the system is synchronized by the addition of the requisite length of auxiliary cable 307, the out-of-phase components from transformer primary coils 316a and 316b cancel and a null is indicated on the cathode ray screen 320. Distance to the fault may then be computed as hereinbefore described.

In accordance with another embodiment of the invention shown in Fig. 4 of the drawings, a double-beam cathode-ray tube is utilized to indicate coincidence of arrival of the signals from the two ends of the system, which are represented on the screen as pips on respective coextensive parallel traces. If desired the pips and parallel traces may be superposed by suitable adjustment of oscilloscope position control voltage.

The primary and auxiliary cables, direct current source, the calibrate-measure circuit, and associated elements, which are numbered 401—414 in Fig. 4 may be assumed to be similar to correspondingly numbered elements described with reference to the system of Fig. 1 hereinbefore.

In the system of Fig. 4, the detecting and amplifying circuit 415 includes the triodes 418 and 419, which respectively comprise plates 422 and 423, cathodes 424 and 425, and grids 420 and 421. The plates 422 and 423 are positively energized by the source 428 connected thereto through separate circuits including the respective resistance feeds 426 and 427. The cathodes 424 and 425 are maintained at negative potentials with respect to the aforesaid plates by connection to the respective cathode resistors 429 and 430; and the grids 120 and 121 are connected to ground and biased negatively with respect to the said cathodes through the respective grid leaks 115 and 116.

Transient waves from the left-hand end of the cable 401 are fed onto the control grid 420 of the tube 418; while waves from the right-hand end of the auxiliary cable 407 are fed onto the control grid 421 of the tube 419. An output circuit connected across the cathode resistor 429 of the tube 418 leads through the blocking condenser 431 and the delay circuit 433 and onto the upper pair of vertical deflecting plates 436 of the double beam cathode ray oscilloscope 435; while a similar circuit connected across the cathode resistor 430 leads through the blocking condenser 432 and the delay network 434 onto the lower set of vertical deflecting plates 437.

The cathode ray tube 435 is assumed to comprise a pair of conventional electron guns in vertical alignment, each having associated focussing electrodes, none of which elements are shown, and which are adapted to produce a pair of vertically aligned spot beams, the upper one of which moves horizontally across the fluorescent screen 444 under control of the upper pair of horizontal deflecting plates, 438, and the lower one of which moves horizontally across the screen 444 along a horizontal line slightly below and parallel to that traced on the screen 444 by the first beam under control of the lower pair of horizontal deflecting plates 439.

The horizontal sweep of the two beams from left to right across the screen 144 is synchronized by parallel connections of the upper horizontal deflecting plates 438 and the lower horizontal deflecting plates 437 to the output of the one trip triggered sweep generator 440. As in the previous embodiments, the operation of the sweep generator 440 is synchronized by transient signals from the left-hand end of the cable system by connection thereto through the contact 441a of the switch 441 and the blocking condenser 442; or alternatively by transients from the right-hand end of the cable system by connection thereto through the contact 441b of the switch 441 and the blocking condenser 443.

The vertical motion of the upper beam on the screen is controlled by the upper set of vertical deflecting plates 436, onto which signals from the left-hand end of the cable system are fed as hereinbefore described; while the vertical motion of the lower beam on the screen is controlled by the lower set of vertical deflecting plates 437 onto which transient signals from the right-hand end of the cable system are fed.

Thus, vertical pips which appear on the upper horizontal trace on the screen 444 are representative of signals from the left-hand end of the cable system; while vertical pips which appear on the lower horizontal trace on the screen 444 are representative of signals from the right-hand end of the cable system. When the length of the auxiliary cable 407 is adjusted so that the return times of the signals from both ends are equal, the corresponding pips are vertically aligned on the screen. Distance to the fault may then be computed as described hereinbefore.

In accordance with a fifth embodiment of the invention, the double-beam cathode ray indicating tube of the previous embodiment is replaced by a single beam tube having a triangular sweep voltage, whereby the signals from one end of the cable system are represented on the screen during the sweep of the beam in one direction thereacross, and signals from the opposite end are represented during the return sweep.

The primary and auxiliary cables, the calibrate measure circuit, the vacuum tube detector circuit, and associated elements numbered 501—530 are similar in structure and functional relationship to correspondingly numbered elements in the previously described system of Fig. 4.

Figure 5A:
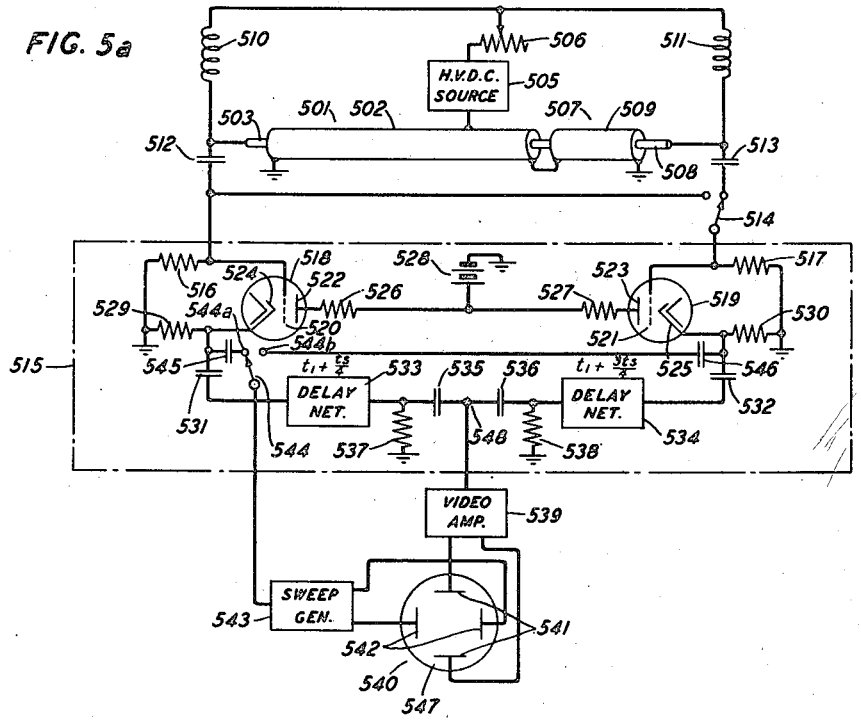
Fig. 5a shows an embodiment of the present invention in which the indicator comprises a cathode ray tube having a triangular sweep voltage.

The indicator circuit of the system of Fig. 5a comprises the conventional cathode ray oscilloscope 540 having a single spot beam which moves across the screen 547 under control of the vertical deflecting plates 541 and horizontal deflecting plates 542.

Figure 5B:
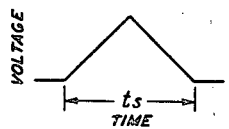

The horizontal deflecting plates 542, which control the horizontal sweep of the beam, are connected across the output of the sweep voltage generator 543, which is a one-trip triggered type designed to have a triangular voltage output, such as indicated schematically in Fig. 5b, which is utilized in place of the conventional saw-tooth sweep voltage. As indicated in Fig. 5b, the voltage from the sweep generator 543 repeatedly increases linearly from a minimum to a maximum value during the first half of the sweep cycle $t_s$, and decreases linearly from maximum to minimum during the second half of the cycle, whereby the beam is caused to periodically sweep horizontally from left to right across the screen 541 at a uniform rate and return from right to left at the same rate. The frequency of the sweep generator 543 is alternatively controlled by signals detected from the left-hand end of the cable system by connection through the contact 544a of the switch 544 and the blocking condenser 545 to the circuit of the cathode 524; or by signals from the right-hand end of the system by connection through the contact 544b and the blocking condenser 546 to the circuit of the cathode 525.

The driving circuit connected to the vertical plates 541 is arranged so that the potential of the plates is under control of signals from the left-hand end of the cable system and from the right-hand end of the system during alternate halves of the sweep cycle, by inclusion in the respective connecting circuits of the specially designed delay networks 533 and 534. The delay network 533, the input of which is connected through the blocking condenser 531 across the output of the cathode resistor 529, and through which signals from the left-hand end of the cable system pass is designed in a manner apparent to those skilled in the art to delay the incoming signals by a total period which is equal to a small initial delay $t_1$ plus an additional period of delay, $t_s/4$, equal to one-fourth of the sweep cycle. The corresponding delay network 534, the input of which is connected through the blocking condenser 532 across the output of the cathode resistor 530, and through which received signals from the right-hand end of the cable system pass is designed to delay the incoming signals by a total period which is equal to a small initial delay $t_1$ plus an additional period of delay, $3t_s/4$, equal to three-quarters of the sweep cycle.

Figure 5C:
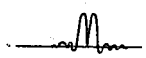
Figs. 5c and 5d show images as they appear on the cathode ray oscilloscope screen.

Signals from the delay network 533 are fed through a storage circuit which includes the series condenser 535 and leakage resistor to ground 537 to the junction point 548, and therefrom through the conventional video amplifier 539 onto the horizontal plates 541 of the cathode ray indicator tube 540. Similarly, signals from the delay network 534 are fed through the series condenser 536, connected to ground, through the leakage resistor 538, to the junction 548, and through the video amplifier 539 onto the horizontal plates 541 of the cathode ray oscilloscope 540. It is thus seen that the signals detected from the right-hand end of the cable system are delayed by one-half of the sweep period with respect to signals detected from the left-hand end of the system. By this device signals from the left-hand end of the system appear on the screen 547 during the sweep of the beam from left to right across the screen 547, whereas signals from the right-hand end of the system appear during the return sweep of the beam. The persistence of the image on the fluorescent screen 547 is of sufficient duration to make the two images appear superposed, as shown in Fig. 5c.

Figure 5D:

To simplify detection of coincidence of arrival of the two signals, the circuit constants on the two sides of the system may be so adjusted so that the images on the screen appears as shown in Fig. 5d.

After a sufficient length of auxiliary cable has been added to the system to produce a superposition of images on the screen, the distance to the fault may be computed as hereinbefore described with reference to the preceding systems.

Figure 6:
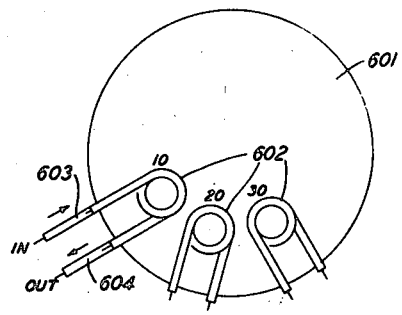

For convenience of computation and calibration, the auxiliary cable designated 107 in Fig. 1, and correspondingly numbered in the systems of Figs. 2, 3, 4 and 5a, may take the form of a series of decade devices of the type shown in Fig. 6, whereby multiples of 100, 10 and 1 foot cable lengths are added to the circuit under control of a selector switch. The decade device shown in Fig. 6 comprises a turn-table 601 adapted to rotate step-wise. Loops of cable 602, successive ones of which represent 10, 20, or 30 foot lengths of cable, are disposed with their respective input and output connecting junctions arranged on the periphery of the turn-table 601, so that the desired coil may be conveniently rotated into position conductively engaging one of its ends to the cable input terminal 603, and the other of its ends to the cable output terminal 604. Thus, a stated length, for example, 10 feet, may be added as a continuous length of cable between the input terminal 603 and the output terminal 604, which are presumably connected in the test system in the position of the auxiliary cable, such as the cable 101 of the system of Fig. 1. It is, of course, desirable for the velocity of propagation of the auxiliary cable to be the same as that of the test cable. If this is not the case, the auxiliary cable length must be multiplied by a suitable compensating factor in the computations.

For the purposes of illustration, the present invention has been described with reference to certain particular embodiments. It is not, however, to be construed as limited to these embodiments, or to the use of any particular element or combination of elements shown, as other systems within the scope of the present invention will be apparent to those skilled in the art.

What is claimed is:

1. The method of locating a fault in an electrical transmission system which comprises applying to said system a high enough voltage to initiate an electromagnet disturbance at said fault whereby transient waves are generated and propagated along the conductors of said system in different directions from said fault, and comparing the transit times of waves traveling along said conductors in different direction from said fault to predetermined points on said conductors.

2. The method of locating a fault in an electrical transmission system which comprises applying to said system a high enough voltage to initiate an electromagnetic disturbance at said fault, varying the electrical path lengths for disturbances traveling in one direction from said fault with respect to the electrical path length for disturbances traveling in another direction from said fault until coincidence occurs in the times of arrival of said disturbances at preselected points.

3. The method in accordance with claim 2 in which the disturbance traveling in one direction from said fault in phase inverted with respect to the disturbance traveling in another direction from said fault.

4. The method in accordance with claim 2 in which the disturbances traveling in opposite directions from said faults are impressed on an indicating circuit during alternate intervals.

5. A system for locating high voltage faults in an electrical coaxial transmission line which comprises in combination a source of potential connected to the ends of said line and the outer sheath for initiating an arc discharge at a fault in said line whereby transient waves are generated at said fault and travel along said line in different directions from said fault, a cathode-ray indicating circuit comprising a source of a beam of electrons, an indicating screen disposed in the path of said beam, a first deflecting means for controlling the motion of said beam in one direction on said screen, and a second deflecting means for controlling the motion of said beam in another direction on said screen, a transformer having a primary coil and a secondary coil, the terminals of said primary coil respectively connected to said line on different sides of said fault for detecting the said transient waves travelling in different directions along said line from said fault to said primary coil, an auxiliary circuit of variable electrical length interposed between said line and one terminal of said primary coil, said secondary coil connected to said first deflecting means for respectively impressing transient waves traveling in different directions from said fault in phase-reversing relation thereon, a sweep-wave generator connected to said second deflecting means, and synchronizing means connected to said generator for controlling the sweep-frequency of said generator in accordance with the frequency of transient waves, whereby the times of arrival at said transformer for waves traveling in different directions from said fault are compared.

6. A system for locating high voltage faults in an electrical transmission coaxial line having at least an outer and inner conductor which comprises in combination a source of potential applied across the insulation of the conductors of said line for initiating an arc discharge at a fault in said line whereby transient waves are generated at said fault and travel along said line in different directions from said fault, a cathode-ray indicating circuit comprising a source of a beam of electrons, an indicating screen disposed in the path of said beam, a first deflecting means for controlling the motion of said beam in one direction on said screen, and a second deflecting means for controlling the motion of said beam in another direction on said screen, a detecting circuit connected to one of said conductors in said line on each side of said fault, and to said first deflecting means for detecting and impressing said transient waves traveling in different directions in reversed phase on said first deflecting means, an auxiliary circuit of variable electrical length interposed between said line on one side of said fault and said detecting circuit for varying the path length traveled by said transient waves in one direction from said fault to said detecting circuit, a sweep-wave generator connected to said second deflecting means, and a synchronizing circuit for controlling the sweep-frequency of said generator in accordance with the frequency of said transient waves, whereby the times of arrival at said detecting circuit of transient waves traveling in different directions from said fault are compared.

7. A system for locating high voltage faults in an electrical transmission coaxial line having at least an inner and outer conductor which comprises in combination a source of potential applied across the insulation of said conductors of said line for initiating an arc discharge at a fault in said line whereby transient waves are generated at said fault and travel along said line in different directions from said fault, a pair of detecting circuits respectively connected to said line on different sides of said fault for receiving and detecting the said transient waves traveling in different directions along said line from said fault to said circuits, an auxiliary circuit of variable electrical length interposed between said line and one of said detecting circuits on one side of said fault for varying the path length traveled by said transient waves from said fault to one said detecting circuit, a cathode-ray indicating circuit comprising sources of a pair of beams of electrons, an indicating screen disposed in the path of said beams, a first deflector individual to each of said beams for controlling the motions of said beams in one direction on said screen, and a second deflector individual to each of said beams for controlling the motions of said beams in another direction on said screen, a sweep-wave generator connected to each of said first deflectors, synchronizing means connected to said line and to said generator for controlling the sweep-frequency of said generator in accordance with the frequency of said transient waves, each of said second deflectors connected to receive output energy from a different one of said detecting circuits for comparing the times of arrival at said detecting circuits of transient waves traveling in different directions from said fault.

8. A system for locating faults in an electrical transmission coaxial line having at least an inner and an outer conductor which comprises in combination a source of potential applied across the insulation of said conductors of said line for initiating an arc discharge at a fault in said line whereby transient waves are generated at said fault and travel along said line in different directions from said fault, a pair of detecting circuits, each said circuit respectively connected to said line on a different side of said fault for receiving and detecting said transient waves traveling in different directions along said line from said fault to said circuits, an auxiliary circuit of variable electrical length interposed between said line and one of said detecting circuits on at least one side of said fault for varying the path length traveled by said transient waves from said fault to one said detecting circuit, a cathode-ray indicating circuit comprising a source of a beam of electrons, an indicating screen disposed in the path of said beam, a first deflecting means for controlling the motion of said beam in one direction on said screen, and a second deflecting means for controlling the motion of said beam in another direction on said screen, a voltage generator connected to said first deflecting means, said generator constructed to impress a periodic voltage across said plates which increases symmetrically from a minimum to a maximum value during each period, whereby said beam is caused periodically to sweep in one direction at a predetermined rate and to return in the opposite direction at substantially the same rate, synchronizing means connected to said voltage generator for synchronizing the operation of said generator with the frequency of said transient waves, a pair of delay circuits each having substantially different periods of delay correlated with the periods of increase and decrease of voltage from said voltage generator respectively connected between each of said detecting circuits and said second deflecting means, whereby the times of arrival at said detecting circuits of transient waves traveling in different directions from said faults are compared.

9. A system for locating faults in an electrical transmission coaxial line having at least an outer and an inner conductor which comprises in combination a source of potential applied across the insulation of said conductors of said line for initiating an electromagnetic discharge at a fault in said line whereby transient waves are generated at said fault and travel along said line in different directions from said fault, detecting means connected to one of said conductors in said line on both sides of said fault for receiving and detecting said transient waves traveling in different directions along said line from said fault to said detecting means, an auxiliary circuit of variable electrical length interposed between said line and said detecting means for varying the relative path lengths traveled in different directions by said transient waves from said fault to said detecting means, a cathode-ray indicating circuit comprising a source of a beam of electrons, an indicating screen disposed in the path of said beam, a first deflecting means for controlling the motion of said beam in a first direction on said screen, a second deflecting means for controlling the motion of said beam in a second direction on said screen, a voltage generator connected to said first deflecting means for controlling the rate of movement of said beam in said first direction, means connected to said generator for synchronizing the operation of said generator in accordance with the frequency of said transient waves, said second deflecting means connected to receive output energy from said detecting means, whereby the times of arrival at said detecting means of transient waves traveling in different directions from said fault are compared.

10. A system for locating a high voltage fault in a multiconductor coaxial transmission line having at least an inner and outer conductor comprising a direct-current voltage source connected to a pair of conductors in said transmission line, the voltage of said source being great enough to produce an electric discharge at said high voltage fault, impedance means connected to said source and said conductors for interrupting said discharge at a periodic rate whereby a periodic succession of electric pulses is transmitted from said fault in both directions along said pair of conductors, a pair of electrical circuits connected to said pair of conductors at respective points on opposite sides of said fault for receiving the said pulses, and means including comparison means connected to both of said electrical circuits and responsive to the pulses received by each thereof for comparing the time of arrival of pulses at one of said points with the time of arrival of pulses at the other of said points.

11. A system in accordance with claim 10 in which said last-mentioned means comprises a cathode-ray oscilloscope having two ray deflectors for deflecting the cathode ray in respectively different directions, a sweep-wave generator connected to one of said ray deflectors, and connections between both of said electrical circuits and the other of said ray deflectors for applying the said received pulses thereto.

12. A system in accordance with claim 11 in which a circuit of adjustable electrical length is electrically interposed in one of said pair of electrical circuits.

MERLE C. BISKEBORN.

REFERENCES CITED

The following references are of record in the file of this patent:

UNITED STATES PATENTS

| Number | Name | Date |
|---|---|---|
| 2,032,904 | Bellaschi | Mar. 3, 1936 |
| 2,253,975 | Guanella | Aug. 26, 1941 |
| 2,315,383 | Andrews | Mar. 30, 1943 |
| 2,321,424 | Rohats | June 8, 1943 |
| 2,345,932 | Gould | Apr. 4, 1944 |